(12) United States Patent  (10) Patent No.: US 8,294,909 B2
Mizuno  (45) Date of Patent: Oct. 23, 2012

(54) DATA-PROCESSING DEVICE

(75) Inventor: Nobuhiro Mizuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1150 days.

(21) Appl. No.: 12/155,154

(22) Filed: May 30, 2008

(65) Prior Publication Data

US 2008/0297824 A1 Dec. 4, 2008

(30) Foreign Application Priority Data

May 31, 2007 (JP) ................................ P2007-145165

(51) Int. Cl.
*G06F 3/12* (2006.01)
*G06K 15/00* (2006.01)
(52) U.S. Cl. ...................... 358/1.13; 358/1.15; 358/1.16; 358/1.18; 358/1.1
(58) Field of Classification Search ........................ None
See application file for complete search history.

(56) References Cited

U.S. PATENT DOCUMENTS

| 7,495,793 | B2 * | 2/2009 | Kojima et al. | 358/1.16 |
| 2004/0027601 | A1 * | 2/2004 | Ito et al. | 358/1.13 |
| 2005/0111034 | A1 * | 5/2005 | Karasaki et al. | 358/1.15 |
| 2006/0044592 | A1 * | 3/2006 | Wakana | 358/1.14 |
| 2006/0227344 | A1 * | 10/2006 | Fujisawa | 358/1.1 |
| 2007/0035771 | A1 * | 2/2007 | Kitamaru | 358/1.18 |

FOREIGN PATENT DOCUMENTS

JP 2003-87701 3/2003

* cited by examiner

*Primary Examiner* — Satwant Singh
(74) *Attorney, Agent, or Firm* — Baker Botts L.L.P.

(57) ABSTRACT

A data-processing device is capable of connecting to a storing unit storing a plurality of image files, each of the plurality of image files including image data and additional information. The data-processing device includes a acquiring unit, a creating unit, a determining unit and a recording unit. The acquiring unit acquires the additional information from each of the plurality of image files. The creating unit that creates an annexed information set with respect to each of the plurality of image files. The annexed information set includes the additional information and identifying information corresponding to the additional information, the identifying information identifying the image file. The determining unit determines one of a plurality of pieces of the additional information included in the annexed information sets corresponding to the plurality of image files. The recording unit records, on a recording medium, the image data of the image file identified by the identifying information corresponding to the additional information determined by the determining unit.

16 Claims, 10 Drawing Sheets

FIG.3A

| FILE NAME | UPDATE DATE AND TIME | FILE SIZE (byte) | EXIF NUMBER | EXIF INFORMATION-UNACQUIRED FLAG |
|---|---|---|---|---|
| 001.jpg | 2006/03/14/00:00:00 | 3,000,000 | 1 | ON |
| 002.jpg | 2006/08/20/01:23:45 | 2,000,000 | 2 | ON |
| 003.jpg | 2006/11/30/12:34:45 | 123,456 | 3 | ON |
| ... | ... | ... | ... | ... |
| 010.jpg | 2007/01/09/23:59:59 | 321,123 | 10 | ON |

FIG.3B

| EXIF NUMBER | FILE NAME | SHOOTING DATE AND TIME | CAMERA TYPE | UPDATE DATE AND TIME |
|---|---|---|---|---|
| 1 | 001.jpg | 2006/01/01/19:28:37 | XXXXX | 2006/03/14/00:00:00 |
| 2 | 002.jpg | 2006/07/07/17:17:17 | YYYYY | 2006/08/20/01:23:45 |
| 3 | 003.jpg | Not_Exif | Not_Exif | 2006/11/30/12:34:45 |
| ... | ... | ... | ... | ... |
| 10 | 010.jpg | 2006/08/31/20:18:43 | ZZZZZ | 2007/01/09/23:59:59 |

| FILE NAME | UPDATE DATE AND TIME | FILE SIZE (byte) | EXIF NUMBER | EXIF INFORMATION-UNACQUIRED FLAG |
|---|---|---|---|---|
| 001.jpg | 2006/03/14/00 : 00 : 00 | 3,000,000 | — | ON |
| 002.jpg | 2006/07/07/05 : 41 : 23 | 1,000,000 | — | ON |
| 003.jpg | 2006/11/30/12 : 34 : 45 | 123,456 | — | ON |
| ... | ... | ... | ... | ... |
| ABC.jpg | 2007/01/09/23 : 59 : 59 | 321,123 | — | ON |

FIG.6B

| FILE NAME | UPDATE DATE AND TIME | FILE SIZE (byte) | EXIF NUMBER | EXIF INFORMATION-UNACQUIRED FLAG |
|---|---|---|---|---|
| 001.jpg | 2006/03/14/00 : 00 : 00 | 3,000,000 | 1 | OFF |
| 002.jpg | 2006/07/07/05 : 41 : 23 | 1,000,000 | — | ON |
| 003.jpg | 2006/11/30/12 : 34 : 45 | 123,456 | 3 | OFF |
| ... | ... | ... | ... | ... |
| ABC.jpg | 2007/01/09/23 : 59 : 59 | 321,123 | — | ON |

FIG.6C

| EXIF NUMBER (65) | FILE NAME (66) | SHOOTING DATE AND TIME (67) | CAMERA TYPE (68) | UPDATE DATE AND TIME (69) |
|---|---|---|---|---|
| 1 | 001.jpg | 2006/01/01/19:28:37 | XXXXX | 2006/03/14/00:00:00 |
| 2 | 002.jpg | 2006/07/07/17:17:17 | YYYYY | 2006/08/20/01:23:45 |
| 3 | 003.jpg | Not_Exif | Not_Exif | 2006/11/30/12:34:45 |
| ... | ... | ... | ... | ... |
| 10 | 010.jpg | 2006/08/31/20:18:43 | ZZZZZ | 2007/01/09/23:59:59 |

DATA-PROCESSING DEVICE

CROSS REFERENCE TO RELATED APPLICATION

This application claims priority from Japanese Patent Application No. 2007-145165 filed May 31, 2007. The entire content of this priority application is incorporated herein by reference.

TECHNICAL FIELD

The present invention relates to a data-processing device, a method of processing data files, and a computer readable recording medium storing a set of program instructions executable on a data-processing device capable of acquiring additional information added to each image file quickly.

BACKGROUND

Exchangeable image file format (Exif) is known as an image file format standardized by JEIDA (Japanese Electronic Industry Development Association). The Exif format is typically employed for a photograph taken by a digital camera. In the Exif format, the information added to each image file is stored in each image file as Exif information. The Exif information is used when a user selects one from a plurality of image files for printing. For example, the Exif information is date and time when the photograph was taken; type of the digital camera used for taking the photograph; aperture and shutter speed settings. The Exif information is extracted from each image file, and the pieces of extracted the Exif information is listed. The user specifies the image file to be printed on the list.

Relating the use of this additional information (Exif information), Japanese Patent Application Publication No. 2003-87701 proposes the technique of creating a circle graph based on the additional information of each extracted image file (see [0013] and [0014]). Specifically, image files are read from a memory card. The additional information of the read files (for example, name and size; and date and time of creation) is then extracted for creating a circle graph. The created circle graph indicates what percentage of the memory is consumed by each image file. The size of each image data is presented as the area of the part bordered by two radii.

In the above technique, each image file has to be opened every time the additional information thereof is used so that the additional information is acquired from each image file. In general, the following three steps are required for reading a file: opening the file; acquiring information from the file; and then closing the file. This means that these file-opening and closing steps have to be repeated as many times as the number of the image files. As the image files increases in number, the ratio of the time required for the file-opening and closing steps increases relative to the time required for acquiring information from the image files.

SUMMARY

In view of the foregoing, it is an object of the present invention to provide a data-processing device capable of acquiring information added to each image file quickly.

In order to attain the above and other objects, the invention provides a data-processing device capable of connecting to a storing unit storing a plurality of image files, each of the plurality of image files including image data and additional information. The data-processing device includes a acquiring unit, a creating unit, a determining unit and a recording unit. The acquiring unit acquires the additional information from each of the plurality of image files. The creating unit that creates an annexed information set with respect to each of the plurality of image files. The annexed information set includes the additional information and identifying information corresponding to the additional information, the identifying information identifying the image file. The determining unit determines one of a plurality of pieces of the additional information included in the annexed information sets corresponding to the plurality of image files. The recording unit records, on a recording medium, the image data of the image file identified by the identifying information corresponding to the additional information determined by the determining unit.

According to another aspect, the present invention provides a method of processing data files, the method including: acquiring additional information from a storing unit, the storing unit storing a plurality of image files, each of the plurality of image files including image data, the additional information and the identifying information, the identifying information identifying the image file; creating an annexed information set with respect to each of the plurality of image files, the annexed information set including the additional information and identifying information corresponding to the additional information, the identifying information identifying the image file; determining one of a plurality of pieces of the additional information included in the annexed information sets corresponding to the plurality of image files; and recording, on a recording medium, the image data of the image file identified by the identifying information corresponding to the additional information determined in the determining step.

According to another aspect, the present invention provides a computer readable recording medium storing a set of program instructions executable on a data-processing device, instructions including: acquiring additional information from a storing unit, the storing unit storing a plurality of image files, each of the plurality of image files including image data, the additional information and the identifying information, the identifying information identifying the image file; creating an annexed information set with respect to each of the plurality of image files, the annexed information set including the additional information and identifying information corresponding to the additional information, the identifying information identifying the image file; determining one of a plurality of pieces of the additional information included in the annexed information sets corresponding to the plurality of image files; and recording, on a recording medium, the image data of the image file identified by the identifying information corresponding to the additional information determined in the determining step.

BRIEF DESCRIPTION OF THE DRAWINGS

The particular features and advantages of the invention as well as other objects will become apparent from the following description taken in connection with the accompanying drawings, in which.

DETAILED DESCRIPTION

A printing device according to an embodiment of the invention will be described while referring to the accompanying drawings wherein like parts and components are designated by the same reference numerals to avoid duplicating description.

Figure 1:
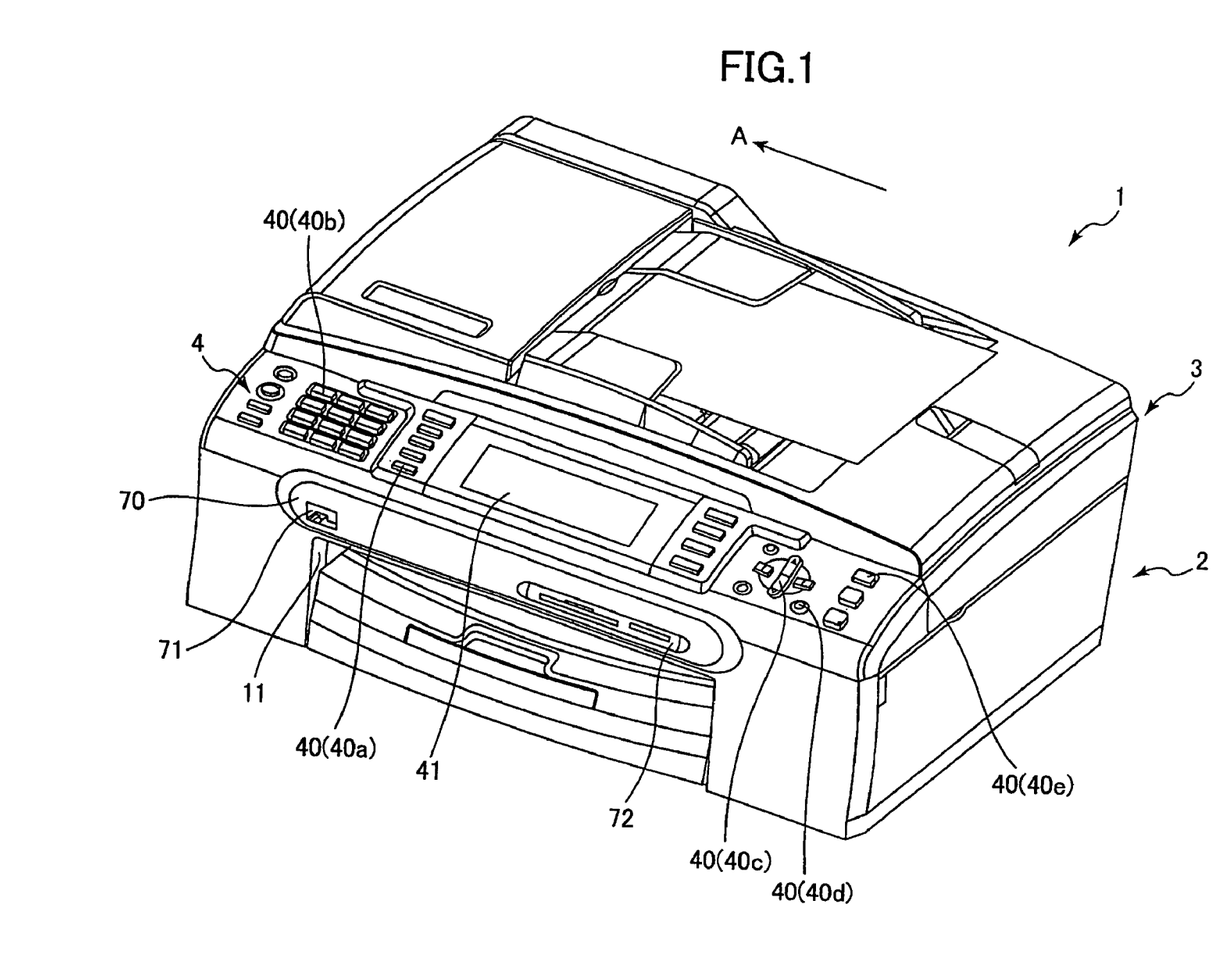
FIG. 1 is a perspective view of a printer as an example of a data-processing device according to an embodiment of the present invention.

FIG. 1 is a perspective view showing a printer 1 according to the embodiment. The printer 1 is a multifunction device that is integrally provided with a print unit 2 in the lower section and a scan unit 3 in the upper section and possesses a printer function, scanner function, copier function, and facsimile function. The printer 1 may be modified to a single-function printer having no scan unit 3 and, hence, no scanner function or copier function.

The printer 1 is primarily connected to a computer (not shown) for recording text and images on a recording paper based on text or image data transferred from the computer.

A control panel 4 is provided on a top front surface of the printer 1 for operating the print unit 2 and scan unit 3. The control panel 4 is configured of various operating buttons and a liquid crystal display (LCD) 41. The printer 1 operates based on operating instructions inputted through the control panel 4 and, when connected to a computer, can operate based on instructions that the computer transmits by means of a printer driver.

The LCD 41 is provided as a rectangle having long sides extending in a width direction indicated by an arrow A. If the dimension in the width direction is employed as the horizontal dimension, the aspect ratio of the LCD 41 becomes 3:8. Specifically, the LCD 41 includes two rectangular independent display screens having an aspect of 3:4 adjacent to one another in the arrow A direction. The display screens are integrally formed as one into the LCD 41.

As a user inputs a predetermined instruction to the printer 1, the printer 1 is controlled by a control unit 20 (see FIG. 2) pursuant to the inputted instruction. The printer 1 operates not only pursuant to an instruction inputted through a control panel 4, but also pursuant to an instruction given from a computer through a printer driver, a scanner driver, or the like.

A connection panel 70 is provided at a position below the control panel 4. The connection panel 70 is positioned above an opening 11. A USB port 71 is provided in a left-side area of the connection panel 70. The USB port 71 is a connecter terminal which is connectable with an external device so that the printer 1 and an external device communicate with each other.

A slot unit 72 is provided at a position on the right side of the connection panel 70. The slot unit 72 includes a plurality of card slots each of which can receive the insertion of a card-type memory. When a card-type memory is inserted into any of the card slots so that the control unit 20 (FIG. 2) to be described later reads image files from the inserted memory card that is a card-type removable memory, the LCD 41 displays the list including the thumbnail images of the read image files with the Exif information added thereto. When the user selects one from the thumbnail images or one from the pieces of Exif information, the printer 1 prints the image corresponding to the selected thumbnail or the selected Exif information on a recording sheet.

Figure 2:
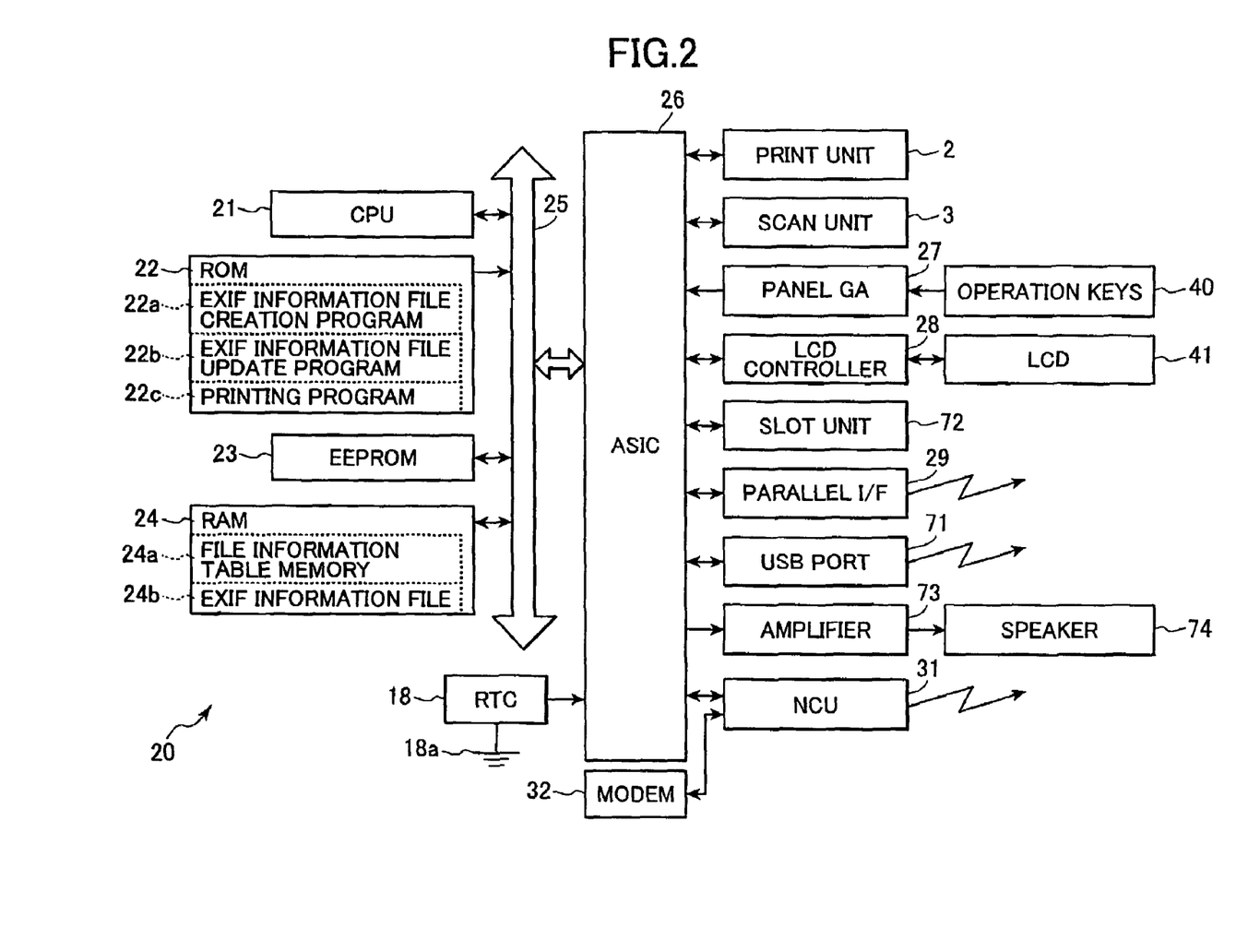
FIG. 2 is a block diagram showing a electrical configuration of the printer.

Next, the structure of the printer 1, which functions as a data processor, will be described with reference to FIG. 2. FIG. 2 is a block diagram showing the electrical structure of the printer 1. As shown in FIG. 2, the control unit 20 includes a CPU 21, a ROM 22, an EEPROM 23, and a RAM 24. These components are all connected to ASIC 26 via a bus 25.

The CPU 21 executes processes according to various programs stored in the ROM 22. The ROM 22 stores an Exif information file creation program 22a, an Exif information file updated program 22b, and a printing program 22c.

Figure 3B:
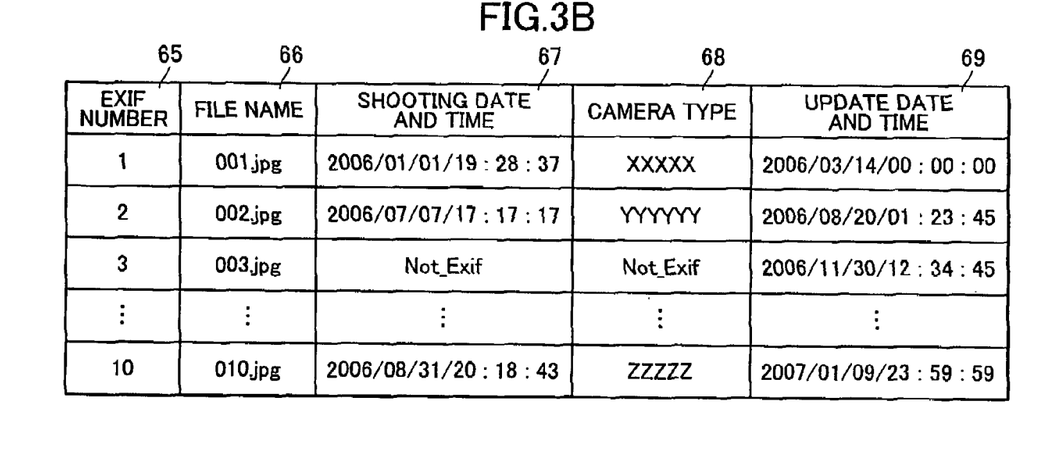
FIG. 3B schematically shows an example of Exif information file.
Figure 4:
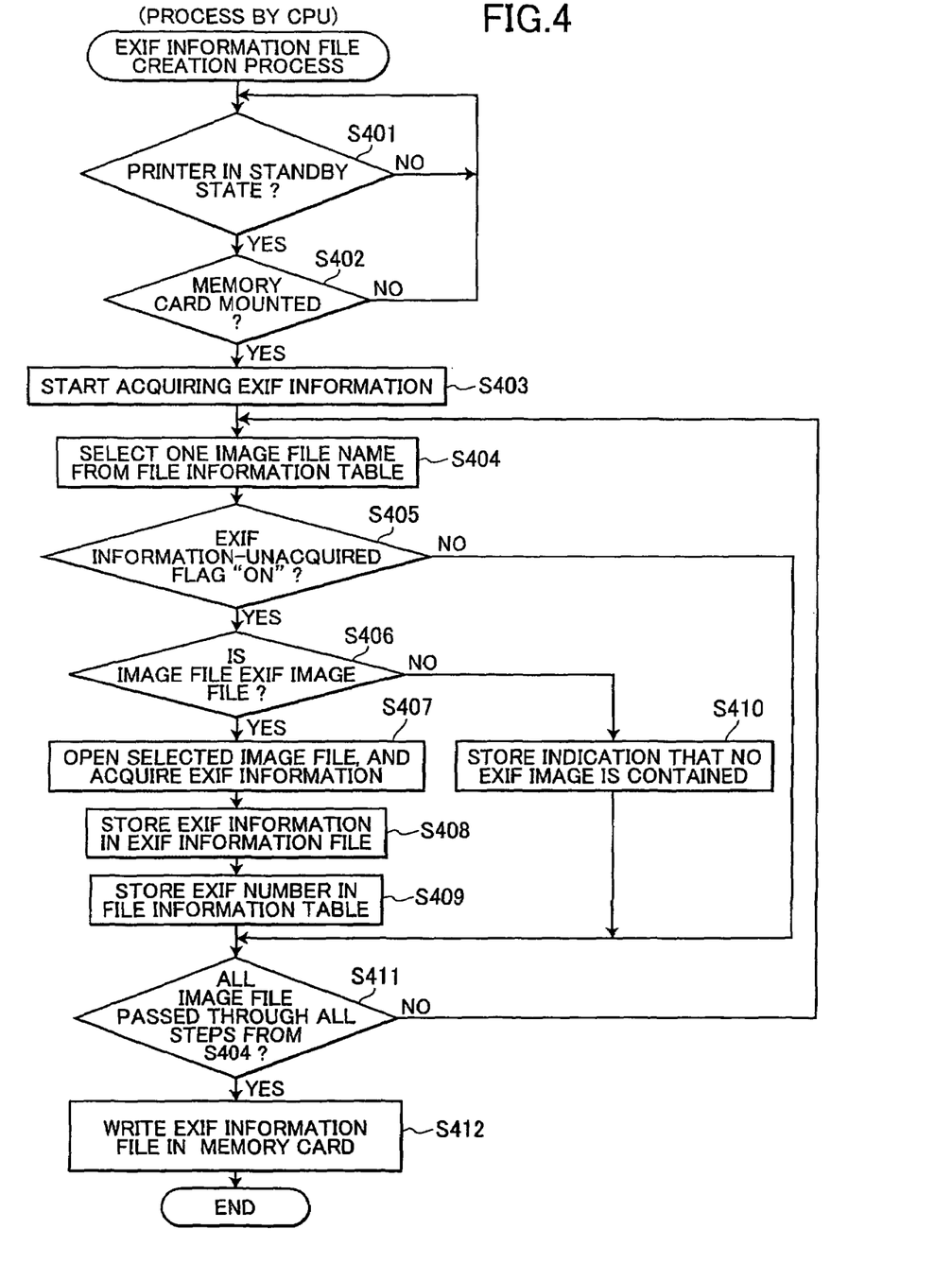
FIG. 4 is a flowchart showing an Exif information file creation process according to the embodiment.
Figure 5:
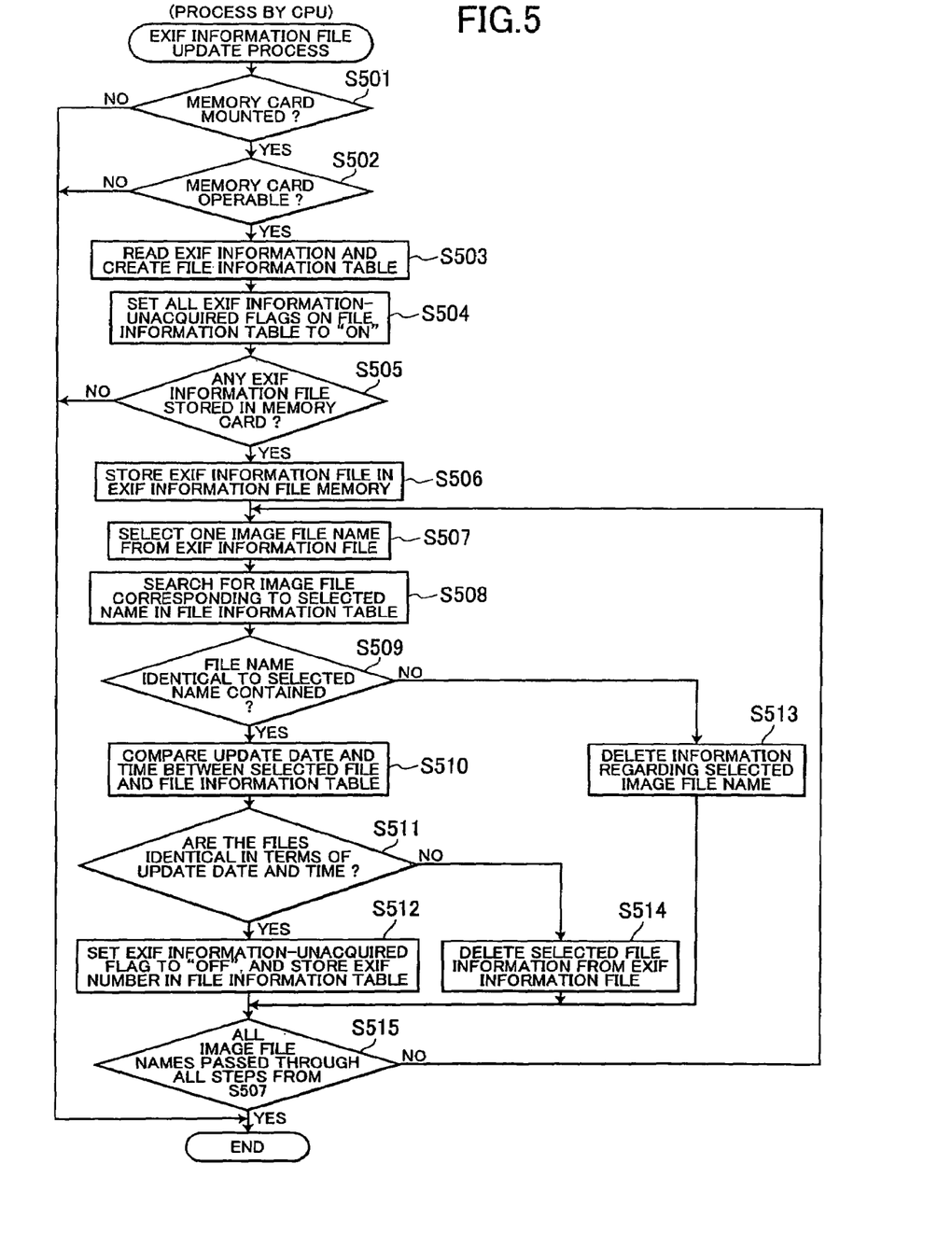
FIG. 5 is a flowchart showing an Exif information file update process according to the embodiment.
Figure 7:
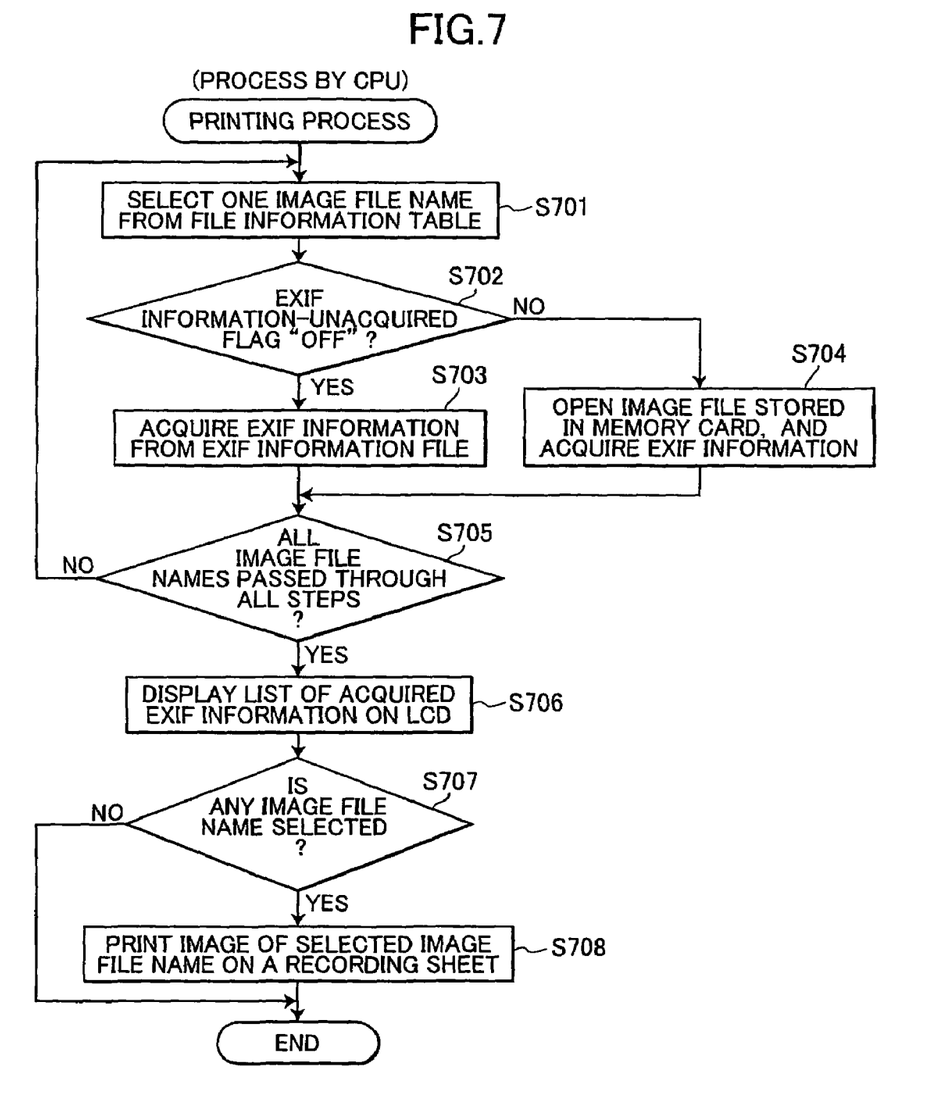
FIG. 7 is a flowchart showing printing process according to the embodiment.
Figure 8:
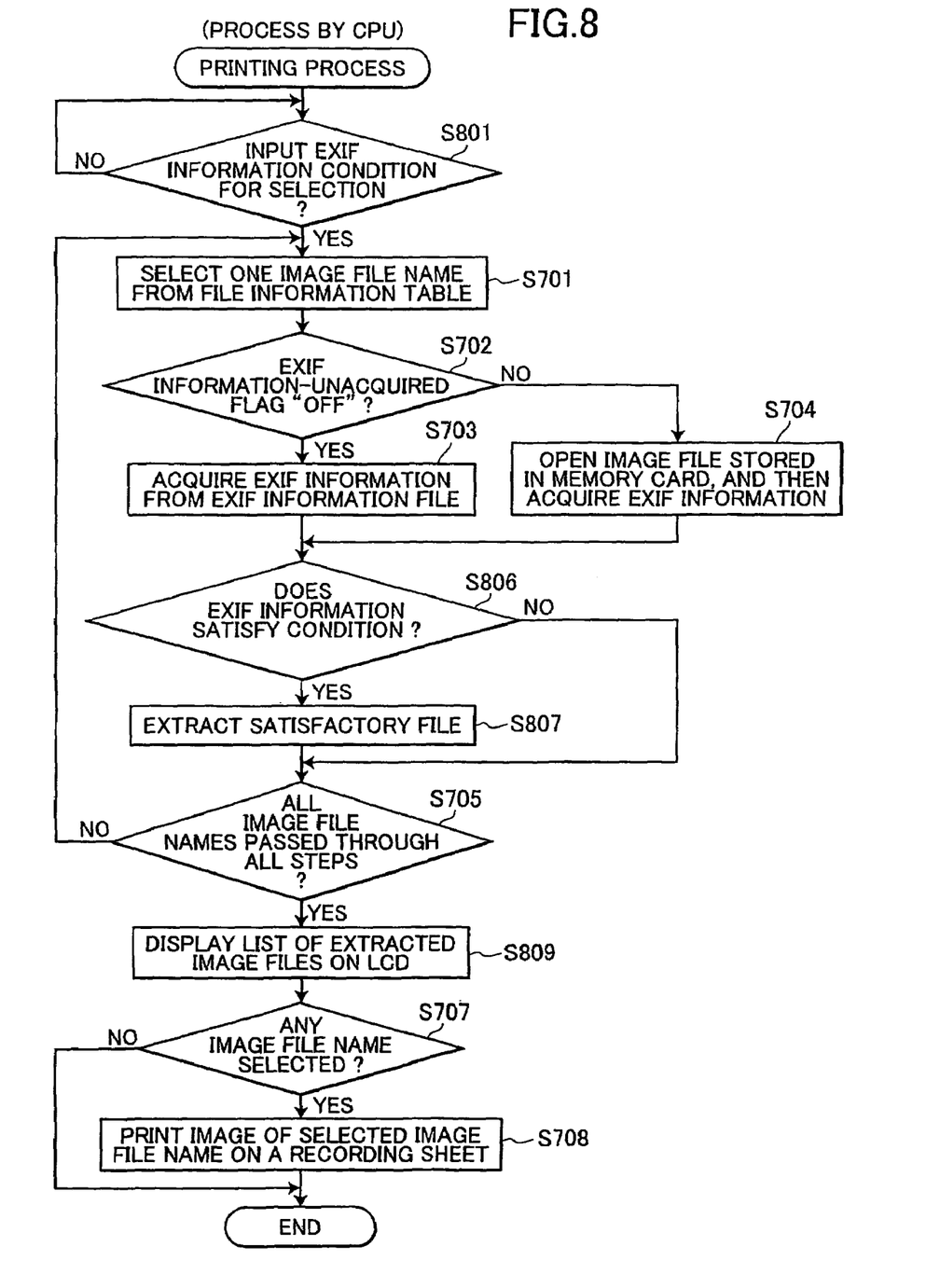
FIG. 8 is a flowchart showing another example of the printing process.

FIG. 4 shows an Exif information file creation process to be performed by the Exif information file creation program 22a. In this process, an Exif information file (see FIG. 3B) is created in text format by storing the Exif information added to each image file for each image file. FIG. 5 shows an Exif information file update process to be performed by the Exif information file update program 22b. In this process, the Exif information file is updated so that the contents of the Exif information file agrees with the image files stored in the memory card. FIGS. 7 and 8 show a printing process to be performed by the printing program 22c. In this process, the image corresponding to the image file selected by the user is printed on a recording sheet through the use of the Exif information added to each image file.

The EEPROM 23 is a rewritable, nonvolatile memory. The RAM 24 includes an Exif information file memory 24a and a file information table memory 24b. The RAM 24 is used as a memory area or working space for temporarily storing various kinds of data required by the CPU 21 for executing the programs.

Figure 3A:
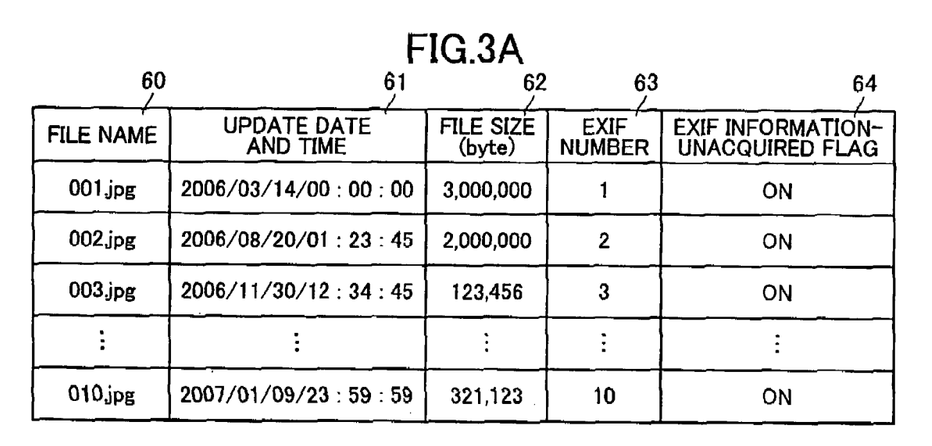
FIG. 3A schematically shows an example of file information table.

The file information table memory 24a stores a file information table which lists the image files stored in the memory card. FIG. 3A schematically shows the file information table stored in the file information table memory 24a. The file information table includes a file name 60, an update date and time 61, a file size 62, an Exif number 63, and an Exif information-unacquired flag 64.

The file name 60 indicates the name of each image file. The update date and time 61 indicates the last date and time when each image file was updated. The file size 62 indicates the size of each image file. These pieces of Exif information are acquired from the image files stored in the memory card, and then stored in the file information table. The Exif number 63 is the unique number assigned to each image file in an Exif information file to be described later. The Exif information-unacquired flag 64 indicates whether or not Exif information has been acquired from each image file. The Exif information-unacquired flag 64 is set to "ON" if the Exif information has not been acquired yet, whereas set to "OFF" if the Exif information has already been acquired.

If an image file has "OFF" as the Exif information-unacquired flag 64 in file information table, this means that the control unit 20 has acquired the Exif information added to the image file. Therefore, the control unit 20 does not have to open the image file again. The control unit 20 can acquire quickly the Exif information of the image file from the Exif information file to be described later.

The Exif information file memory 24b stores the Exif information file read from the memory card. The Exif information file is described with reference to FIG. 3B. FIG. 3B schematically shows the Exif information file. The Exif information file stores an Exif number 65; a file name 66; a shooting date and time 67; a camera type 68; and an update date and time 69.

The file name 60, update date and time 61, file size 62, file name 66, shooting date and time 67, camera type 68, and update date and time 69 are stored in the RAM 24, based on the Exif information added to each image file as an Exif header stored in the memory card. The Exif header-added image file is employed for general-purpose applications. Therefore, the present invention is available in various situations.

The Exif number 65 indicates the unique number assigned to each image file. The file name 66 indicates the name of each image file. The shooting date and time 67 indicates the date and time when the image of each image file was shot. The camera type 68 indicates the type of the digital camera with which each image file was shot. The update date and time 69 indicates the last date and time when each image file was updated. The Exif information file can also include information regarding aperture and shutter speed settings.

The Exif information file stores the Exif information of each image file in text format. The control unit 20 can read the Exif information of each image file from the Exif information file. The control unit 20 does not have to open each image file every time the control unit 20 requires the Exif information thereof. Therefore, the control unit 20 can acquire the Exif information of each image file more quickly than the case where the control unit 20 opens each image file to acquire the Exif information thereof.

Returning to FIG. 2, the ASIC 26 is connected to a panel gate array 27 (panel GA 27) which controls operation keys 40 for allowing the user to input an instruction to the printer 1. The ASIC 26 is connected to an LCD controller 28 which controls a display screen of the LCD 41. The ASIC 26 is connected to a parallel I/F 29 and a USB port 71 for transmitting or receiving data to or from the computer by way of a parallel cable or a USB cable. The ASIC 26 is connected to a speaker 74 through an amplifier 73. The ASIC 26 is also connected to a real time clock (RTC) 18 as a chip which works as a time keeper. A battery 18a is connected to the RTC 18 so that the RTC 18 can keep working even while no power is supplied. The ASIC 26 is further connected to a network control unit (NCU) 31. The NCU 31 is connected to a modem 32.

The ASIC 26 controls the operations of the print unit 2, a scan unit 3, the control panel 4, and the slot unit 72, pursuant to the instruction given by the CPU 21. Specifically, the ASIC 26 controls a motor for driving the print unit 2; an inkjet recording head; a motor for driving an ADF included in the scan unit 3; an image reading unit; and the memory card mounted in the slot unit 72.

Figure 3C:
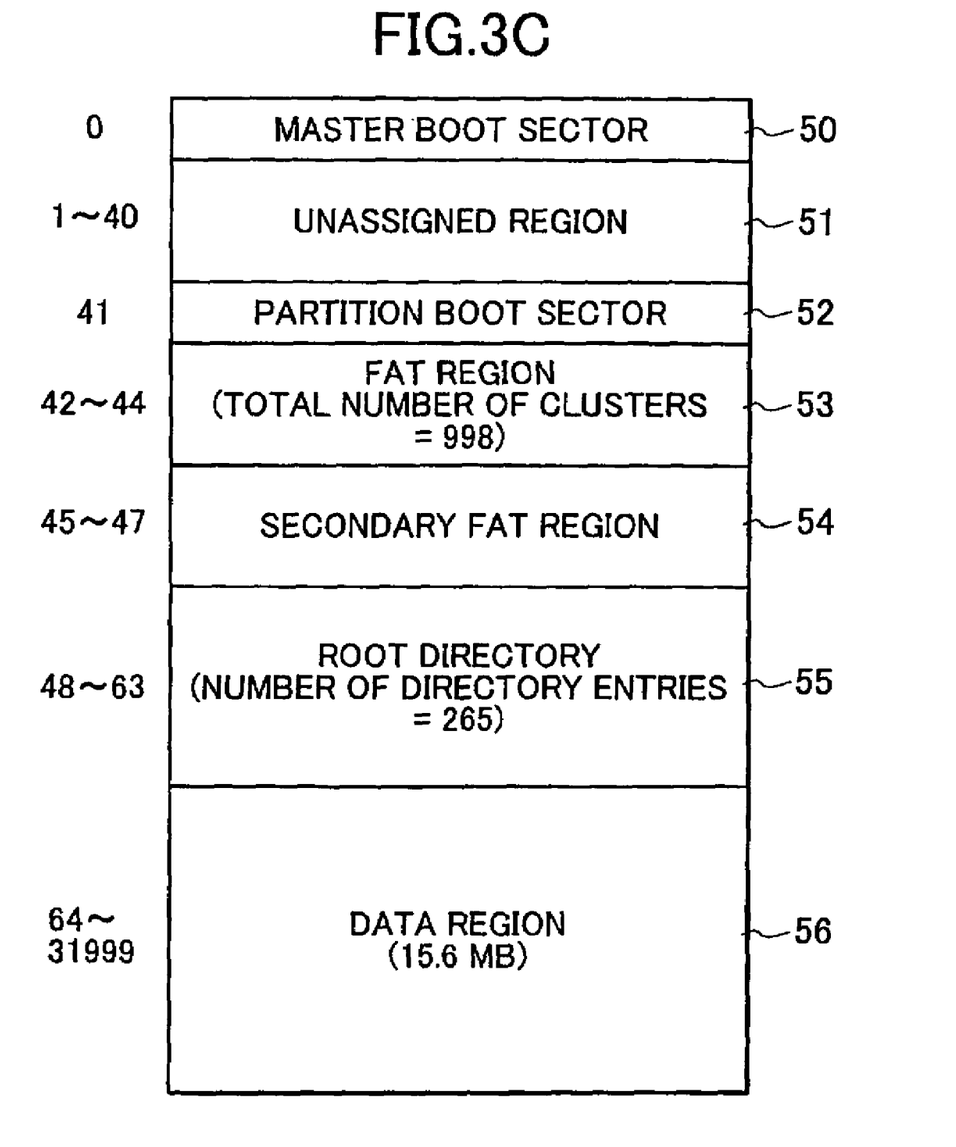
FIG. 3C schematically shows the configuration of a memory card.

The configuration of a memory card to be inserted into one of the card slots included in the slot unit 72 is briefly described with reference to FIG. 3C. FIG. 3C schematically shows the configuration of the memory card. Each image file stored in the memory card is managed in clusters in a file allocation table (FAT). A typical logical format is employed for the memory card. The typical logical format includes in the following order from the top: a master boot sector 50; an unassigned region 51; a partition boot sector 52; a FAT region 53; a secondary FAT region 54; a root directory 55; and a data region 56. The memory card according to this embodiment has a storage capacity of 16 MB. The numbers "0-31999" attached to the immediate left of each section included in the memory card, indicate logical sector numbers.

The master boot sector 50 is provided at the first sector of the memory card. The master boot sector 50 stores information as to by which OS and how the CPU 21 is started. The partition boot sector 52 stores partition information contained in the master boot sector 50. The FAT region 53 stores the busy condition of the memory card, including the following information: which sectors an image file occupies on the memory card; how the sectors are joined to each other; which sectors are vacant; and which sectors are bad. The secondary FAT region 54 is a region obtained by copying the FAT region 53. The root directory 55 is the top-most directory in a tree-like hierarchy. All the image files on the memory card have to belong to any directory, and the directories other than the root directory have to belong to different directories. If the memory card is divided into a plurality of partitions, each partition has its own root directory. The data region 56 is a region which stores image files.

Next, the Exif information file creation process is described with reference to FIG. 4. In the Exif information file creation process, the CPU 21 creates an Exif information file in text-format by storing the Exif information added to each image file contained in the memory card, for each image file. The Exif information file creation process is performed at predetermined intervals.

In S401, the CPU 21 determines whether or not the printer 1 is in standby state. The standby state according to this embodiment means a state that no function is performed out of a copy function, a facsimile function, a telephone function, and a printer function. If the CPU 21 determines that the printer 1 is in standby state (S401: Yes), the CPU 21 determines whether or not the memory card has been mounted in one of the card slots in S402.

If the memory card has been mounted in one of the card slots (S402: Yes), the CPU 21 starts acquiring or fetching Exif information in S403. If any one of the functions is performed (S401: No), alternatively, if no memory card has been mounted (S402: No), the CPU 21 repeatedly performs the steps starting from S401.

In the Exif information file creation process, the CPU 21 starts creating an Exif information file on the condition that no function is performed out of the copy function, the facsimile function, the telephone function, and the printer function. This means that the copy function, the facsimile function, the telephone function, and the printer function are not delayed due to the Exif information file creation process.

As the CPU 21 starts acquiring Exif information in S403, the CPU 21 selects one from the image file names on the file information table stored in the file information table memory 24a in S404. If the file information table does not stored in the file information table memory 24a, the CPU 21 executes the information table update process (FIG. 5) will be described later, and returns the Exif information file creation process. In S405, the CPU 21 determines whether or not the Exif information-unacquired flag 64 corresponding to the selected image file name is "ON", specifically, whether or not the Exif information of the file corresponding to the selected file name has not been acquired yet.

If the CPU 21 has determined that the Exif information-unacquired flag 64 is "ON", specifically, that the Exif information of the file corresponding to the selected file name has not been acquired (S405: YES), the CPU 21 then determines whether or not the image file corresponding the selected file name contains an Exif image in S406. On the other hand, if the CPU 21 has determined that the Exif information-unacquired flag 64 is "OFF", specifically, that the Exif information 64 of the file corresponding to the selected file name has been acquired (S405: NO), the CPU 21 proceeds to S411 to be described later.

If the CPU 21 has determined that the file corresponding to the selected file name contains an Exif image (S406: Yes), the CPU 21 opens the image file and acquires Exif information from the image file (shooting date and time, and camera type in this embodiment) in S407. In S408, the CPU 21 creates as an Exif information file and the stores the acquired Exif information therein. In S409, the CPU 21 stores the number which is the same as the Exif number 65 corresponding to the Exif information contained in the Exif information file, in the file information table. In this case, the stored number is associated with the selected image file name. Then the CPU 21 proceeds to S411.

On the other hand, the CPU 21 has determined that the file corresponding the selected file name contains an Exif image (S406: No), the CPU 21 stores "Not_Exif" in the Exif information file so as to indicate that the file corresponding to the selected file name contains no Exif image in S410. The CPU 21 then proceeds to S411.

In S411, the CPU 21 determines whether or not all the image file names stored in the file information table have passed through all the steps starting from S404. If all the image file names have passed through all the steps (S411: Yes), the CPU 21 writes the created Exif information file in a specified directory in the memory card in S412. The CPU 21 exits this process.

The Exif information file is created, and the created Exif information file is stored in the memory card. By storing the created Exif information file in the memory card, the printer 1 requires less memory. Furthermore, since the memory card is likely to store the image files corresponding to the Exif information contained in the Exif information file, the CPU 21 efficiently acquire the Exif information of the image files stored in the memory card, from the Exif information file, efficiently.

Next, the Exif information file update process is described with reference to FIGS. 5 through 6C. FIG. 5 is a flowchart showing the Exif information file update process. In the Exif information file update process, the Exif information file is updated so as to reflect the change regarding the image files stored in the memory card.

In S501, the CPU 21 determines whether or not the memory card has been mounted in one of the card slots. If the memory card has been mounted in one of the card slots (S501: Yes), the CPU 21 then determines whether or not the memory card is operable in S502. If the CPU 21 has determined that the memory card is operable (S502: Yes), the CPU 21 reads the directory entry of the mounted memory card, and then stores the name, the update date and time, and the size of each image file in the file information table of the file information table memory 24a in S503. In S504, the CPU 21 sets all the Exif information flags 64 on the file information table to "ON". Specifically, the CPU 21 regards all the pieces of Exif information as unacquired.

Figure 6A:
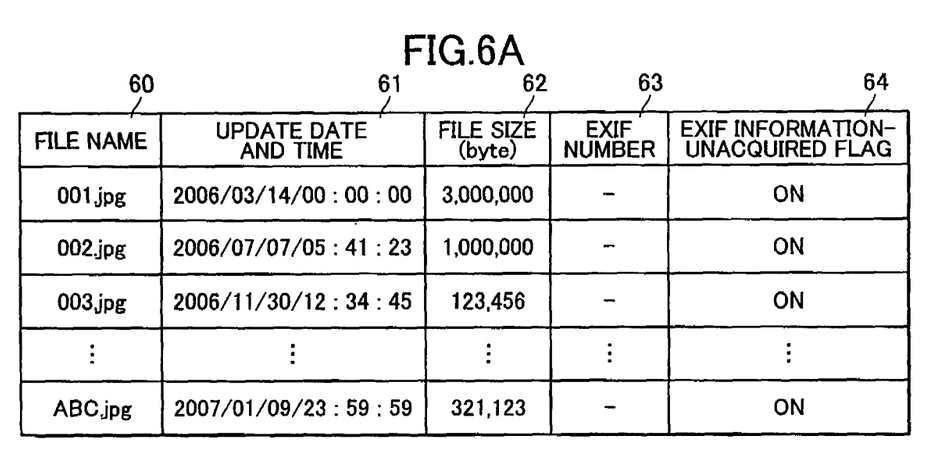
FIG. 6A schematically shows an example of a file information table during its creation.
Figure 6B:
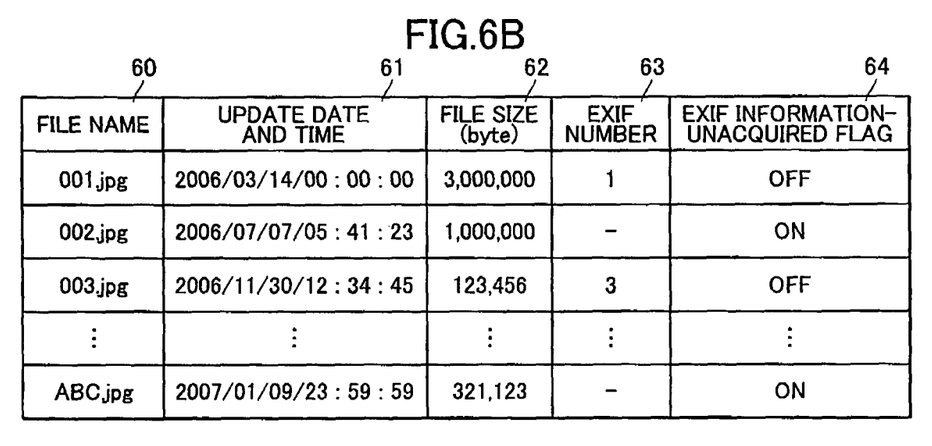
FIG. 6B schematically shows an example of the file information table after its creation.

Specifically, as shown in FIG. 6A, the file information table stores the file name 60, the update date and time 61, and the file size 62, for each image file. In the file information table, all the Exif information flags 64 are set to "ON", and an Exif number is added as will be described later. On the other hand, if no memory card has been mounted (S501: No), alternatively, if the memory card is not operable (S502: No), the CPU 21 exits the Exif information file update process.

As the file information table is created as shown in FIG. 6A, the CPU 21 determines whether or not the memory card stores any Exif information file in S505. If any Exif information file is stored (S505: Yes), the CPU 21 reads the Exif information file and then stores the read Exif information file in the Exif information file memory 24b in S506. In this embodiment, the Exif information file shown in FIG. 6C, which is contained in the memory card, is stored in the Exif information file memory 24b.

In S507, the CPU 21 selects one image file name from the Exif information file stored in the Exif information file memory 24b. In S508, the CPU 21 starts searching for the image file corresponding to the selected file name in the file information table created in the S503.

In S509, the CPU 21 determines whether or not the file information table contains the file name which is the same as the selected file name. If the CPU 21 has determined that the file information table contains the same file name (S509: Yes), the CPU 21 then compares the update date and time stored in the file information table corresponding to the same file name, with the update date and time corresponding to the selected file name in S510. In S511, the CPU 21 determines whether or not these files are identical in terms of update date and time.

If the files are identical (S511: Yes), the CPU 21 determines that the file corresponding to the selected file name has been stored in the file information table in S512. The CPU 21 sets the Exif information-unacquired flag 64 corresponding to the file having the same name as the selected file name to "OFF" in the file information table. The CPU 21 then stores the number which is the same as the Exif number 65 of the selected file name stored in the Exif information file, as an Exif number 63 in the file information table. The CPU 21 then proceeds to S515.

FIG. 6A shows the file information table during its creation. FIG. 6B shows the file information table after its creation. FIG. 6C shows the Exif information file stored in the Exif information file memory 24b before its update. For example, a file name 66 of "001jpg" with an update date and time 69 of "2006/03/14/00:00:00" is selected from the image file names contained in the Exif information file shown in FIG. 6C, the image file having the same update date and time as the file name is included in the file information table shown in FIG. 6A. Accordingly, the CPU 21 sets the Exif number 63 of the image file name in the file information table to "1", which is the same Exif number as the selected file name as shown in FIG. 6B. At the same time, the CPU 21 sets the Exif information-unacquired flag 64 from "ON" to "OFF", and the Exif information is set from unacquired to acquired.

Returning to FIG. 5, if the CPU 21 has determined that the file information table has the same file name as the name of the selected image file (S509: No), the CPU 21 determines that the selected image file has already been deleted from the currently mounted memory card, and deletes the information regarding the selected image file from the Exif information file in S513. The CPU 21 then proceeds to S515.

Figure 6C:
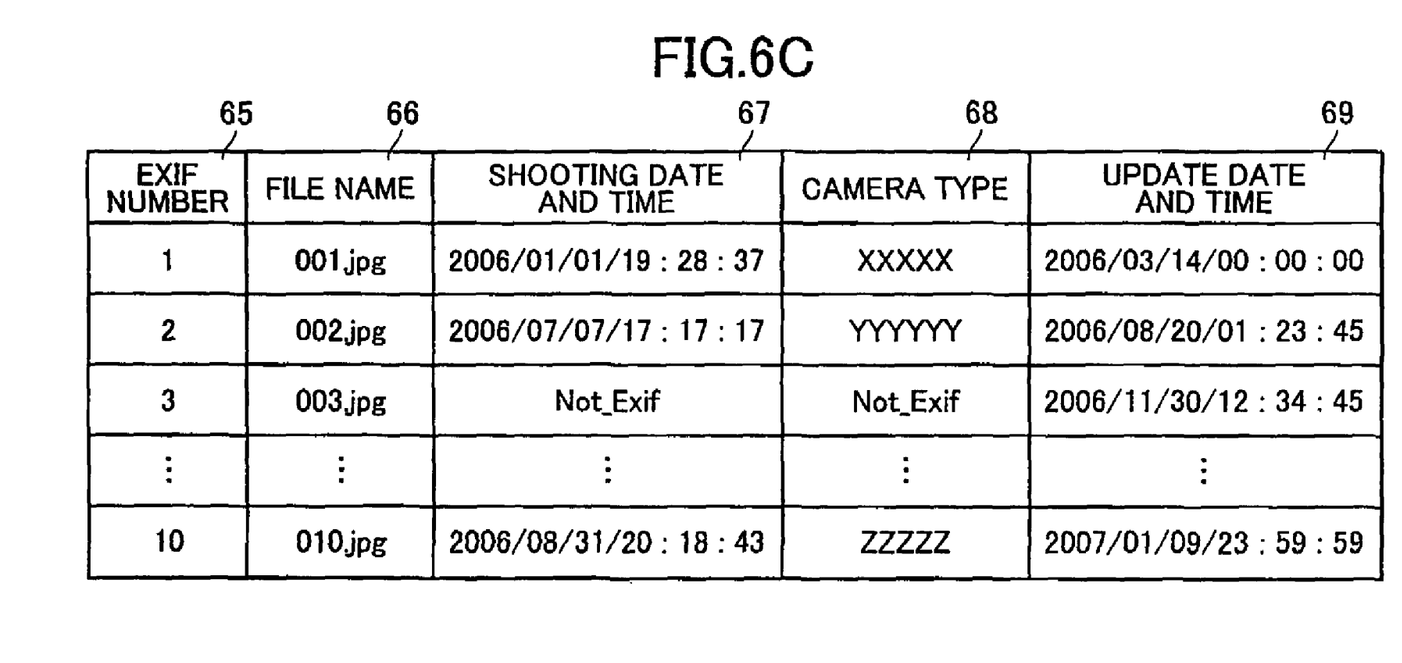
FIG. 6C schematically shows an example of the Exif information file before its update.

For example, if a file name 66 of "010jpg" with an update date and time 69 of "2007/01/09/23:59:59" is selected from the image file names contained in the Exif information file shown in FIG. 6C, the image file having this file name is not included in the file information table shown in FIG. 6A. Therefore, the CPU 21 deletes the information regarding the image file whose file name 66 is "010jpg" and whose update date and time 69 is "2007/01/09/23:59:59" from the Exif information file shown in FIG. 6C.

If the CPU 21 determines that the update dates and times are not identical (S511: No), the CPU 21 determines that the image file of the name selected from the Exif information file and the image file stored in the memory card are different although their file names are identical. Therefore, the CPU 21 deletes the information regarding the selected file name from the Exif information file in S514. The CPU 21 then proceeds to S515.

Specifically, if a file name 66 of "002jpg" with an update date and time 69 of "2006/08/20/01:23:45" is selected from the image file names contained in the Exif information file shown in FIG. 6C, the image file having the same update date and time is not included although the image file having this file name is included. Therefore, the CPU 21 deletes the information regarding the image file whose file name 66 is "002jpg" and whose update date and time 69 is "2006/08/20/01:23:45" from the Exif information file shown in FIG. 6C.

Accordingly, the printer 1 can delete an unnecessary piece of the Exif information from the Exif information file. At the same time, the printer 1 can keep the other necessary pieces of the EXif information in the Exif information file.

Returning to FIG. 5, in S515, the CPU 21 determines whether or not all the image file names stored in the Exif information file read from the memory card in S506 have passed through all the steps starting from S507. If all the image files have passed through all the steps (S515: Yes), the CPU 21 exits this process. If all the image files have not passed through all the steps yet, the CPU 21 repeatedly performs the steps starting from S507. In the Exif information file update process, the CPU 21 can update the Exif information file so that the information stored in the Exif information file and the information regarding the image files currently stored in the memory card agree with each other in terms of content.

Next, the printing process is described with reference to FIG. 7. In the printing process, by using the Exif information corresponding to a plurality of image files stored in the memory card by the user, the CPU 21 selects one from the image files so as to print the image of the selected image file on a recording sheet. This process is performed, for example, pursuant to the user's instruction.

In S701, the CPU 21 selects one image file name from the information stored in the file information table. In S702, the CPU 21 determines whether or not the Exif information-unacquired flag 64 of the selected file name is "OFF", specifically, whether or not the Exif information of the file corresponding to the selected file name has been acquired. If the CPU 21 has determined that the Exif information-unacquired flag 64 is "OFF" (S702: Yes), the CPU 21 acquires the Exif information of the file of the selected name from the Exif information file in S703. Then the CPU 21 proceeds to S705.

On the other hand, if the CPU 21 has determined that the Exif information-unacquired flag 64 is "ON" instead of "OFF", specifically, that the Exif information has not been acquired yet (S702: No), the CPU 21 specifies the image file corresponding to the selected file name from the memory card, opens the specified image file stored in the memory card, and then acquires the Exif information from the image file in S704. The CPU 21 proceeds to S705.

In S705, the CPU 21 determines whether or not all the image file names stored in the file information table have passed through all the steps from S701. If all the image file names have passed through all the steps (S705: Yes), the CPU 21 then proceeds to S706. If all the image file names have not passed through all the steps yet (S705: No), the CPU 21 repeatedly performs the steps starting from S701.

In S706, the CPU 21 displays the list of the Exif information acquired in S703 and S704 on the LCD 41 for each image file. In S707, the CPU 21 determines whether or not the user selects any image file name from the displayed Exif information list. This selection is made by the user through the operation keys 40. If the user selects no image file name even after a predetermined period of time (S707: No), the CPU 21 exits the process. If the user selects any image file name after a predetermined period of time (S707: Yes), the CPU 21 opens the image file of the selected image file name and prints the image of the selected image file name on a recording sheet in S708. Then the CPU 21 exits the process.

In the printing process, the CPU 21 acquires the Exif information from the Exif information file in S702 if the Exif information-unacquired flag 64 thereof is "OFF", specifically, if the Exif information has already been acquired. Therefore, the CPU 21 does not have to open all the image files stored in the memory card so as to acquire the Exif information thereof. This allows the CPU 21 to extract the Exif information from each image file quickly.

Next, another printing process, which is different from the printing process shown in FIG. 7, is described with reference to FIG. 8. In this printing process, if the user selects an image file from the image files stored in the memory card by specifying a condition in terms of Exif information, the CPU 21 prints the image of the selected image file on a recording sheet.

In S801, the CPU 21 determines whether or not the user has inputted any condition in terms of Exif information for selection. The CPU 21 displays selectable Exif information conditions on the LCD 41 in the form of a menu so that the user makes a selection from the menu by using the operation keys 40. If the conditions imposed on the Exif information are inputted (S801: Yes), the CPU 21 selects one from the image file names stored in the file information table in S701. In S702, the CPU 21 determines whether or not the Exif information-unacquired flag 64 of the selected image file name is "OFF". If the Exif information-unacquired flag 64 is "OFF" (S702: Yes), the CPU 21 acquires the Exif information from the Exif information file in S703. The CPU 21 then proceeds to S806.

On the other hand, if the Exif information-unacquired flag 64 is "ON" (S702: No), the CPU 21 specifies the file corresponding to the selected file name in the memory card, and then opens the file so as to acquire the Exif information thereof in S704. The CPU 21 then proceeds to S806.

In S806, the CPU 21 determines whether or not the Exif information acquired in S703 satisfies the Exif information condition inputted in S801, or whether or not the Exif information acquired in S704 satisfies the Exif information condition inputted in S801, in S806. If the satisfaction is found (S806: Yes), the file of the selected name is extracted in S807. The CPU 21 then proceeds to S705. On the other hand, if no satisfaction is found in S806, the CPU 21 skips S807 to move on to S705.

In S705, the CPU 21 determines whether or not all the image file names stored in the file information table 24b have passed through all the steps from S701. If all the image file names have not passed through all the steps yet (S705: No), the CPU 21 repeatedly performs the steps starting from the S701. If all the image files have passed through all the steps (S705: Yes), the CPU 21 executes the process of S809.

In S809, the CPU 21 displays the list of the image files extracted in S807 on the LCD 41. In S707, the CPU 21 determines whether or not the user selects any image file name from the displayed list. Note that the user makes this selection through the operation keys 40. If the user has selected no image file name even after a predetermined period of time (S707: No), the CPU 21 ends the printing process. If the user has selected any image file name after a predetermined period of time (S707: Yes), the CPU 21 prints the image of the selected image file name on a recording sheet in S708. The CPU 21 ends the printing process.

In this printing process, if the Exif information-unacquired flag 64 is "OFF" (S702: Yes), the CPU 21 does not have to open all the image files stored in the memory card so as to acquire the Exif information thereof. This allows the CPU 21 to extract the image file having the Exif information identical to the Exif information selected by the user, thereby printing the image of the selected file name quickly.

With this construction, the CPU 21 is operated when an operation instruction is inputted via the operation keys 40 by user of the printer 1. Therefore, the Exif information file can be created whenever the user wants.

While the invention has been described in detail with reference to the embodiments thereof, it would be apparent to those skilled in the art that various changes and modifications may be made therein without departing from the spirit of the invention.

In the foregoing embodiment, the Exif information file creation process is performed while the printer 1 is in standby state. However, the Exif information file creation process can be performed when the user instructs the CPU 21 to perform the process. Furthermore, the Exif information file creation process can be performed after the LCD 41 displays the thumbnail image of each image file. If the Exif information file creation process is performed after the thumbnail images are displayed, this means that each image file has been opened at least once when the Exif information file creation process is performed. Therefore the process of opening each image file only for creating the Exif information file can be omitted.

In the forgoing embodiments, the printer 1 is primarily connected to a computer (not shown) for recording text and images on a recording paper based on text or image data transferred from the computer. However, the printer 1 may also be connected to an external device such as a digital camera and may record image data inputted from the digital camera on a recording paper. Also, the printer 1 may be loaded with a memory card or other storage medium and may be capable of recording image data stored on the storage medium on a recording paper.

Further, since the Exif information contains both the name of an image file or the creation date and time thereof, the printer 1 can check whether or not the Exif information contained in the Exif information file and the Exif information stored in the RAM 24 are identical with each other more correctly. Alternatively, since Exif information may contain either one of the name of an image file or the creation date and time thereof, the printer 1 can check whether or not the Exif information contained in the Exif information file and the Exif information stored in the RAM 24 are identical with each other with less amount of memory.

In the forgoing embodiments, in the process of S708, the CPU 21 prints, on the recording sheet, an image based on selected file name by user. However, in S708, the CPU 21 can record, on a recording storage medium, the image of the image file identified by the file name corresponding to the Exif information selected by the user.

In the second embodiment, the list of the Exif information is displayed on the LCD 41 so that the user can select one of the Exif information. However, the process of S809 and S707 as shown in FIG. 8 can be omitted, and the CPU 21 can prints an image based on the image file identified by the Exif information extracted in the process of S807.

What is claimed is:

1. A data-processing device capable of connecting to a storing unit storing a plurality of image files, each of the plurality of image files including image data and additional information, the data-processing device comprising:

an acquiring unit that acquires the additional information from each of the plurality of image files;

a creating unit that creates an annexed information set with respect to each of the plurality of image files, the annexed information set including the additional information and identifying information corresponding to the additional information, the identifying information identifying the image file;

a determining unit that determines one of a plurality of pieces of the additional information included in the annexed information sets corresponding to the plurality of image files;

a recording unit that records, on a recording medium, the image data of the image file identified by the identifying information corresponding to the additional information determined by the determining unit; and an annexed information set storing unit that stores the annexed information sets in the storing unit, wherein the creating unit further comprises:

an identifying information storing unit that stores the identifying information when the storing unit is connected to the main body;

a determining unit that determines whether or not the annexed information set is stored in the storing unit;

a comparing unit that compares the identifying information in the annexed information set with the identifying information in the identifying information storing unit when the determining unit determines that the annexed information set is stored in the storing unit; and a deleting unit that deletes the annexed information set when the identifying information included in the annexed information set is not identical to the identifying information stored in the identifying information storing unit.

2. The data-processing device according to claim 1, wherein the determining unit comprises:

a display unit that displays a plurality of pieces of the additional information included in the annexed information sets corresponding to the plurality of image files; and a selecting unit that enables a user to select one of the plurality of pieces of the additional information displayed on the display unit, and wherein the recording unit records, on the recording medium, the image data of the image file identified by the identifying information corresponding to the additional information selected by the user.

3. The data-processing device according to claim 1, wherein the determining unit comprises:

a condition-inputting unit that enables the user to input a condition; and an extraction unit that extracts the additional information satisfying the condition from the annexed information sets, and wherein the recording unit that records, on the recording medium, the image data of the image file identified by the identifying information corresponding to the additional information extracted by the extraction unit.

4. The data-processing device according to claim 3, wherein the determining unit further comprises:

a display unit that displays one or more pieces of the additional information extracted by the extraction unit; and a selecting unit that enables a user to select one of the one or more pieces of the additional information displayed on the display unit, and wherein the recording unit records, on the recording medium, the image data of the image file identified by the identifying information corresponding to the additional information selected by the user.

5. The data-processing device according to claim 1, wherein the identifying information is configured of at least one of a file name and creation date and time.

6. The data-processing device according to claim 1, further comprising an instruction-input unit that enables the user to input an instruction to operate the creating unit, and
wherein the creating unit creates the annexed information sets when the instruction is inputted through the instruction-input unit.

7. The data-processing device according to claim 1, further comprising:
a printer section capable of implementing a print function;
a scanner section capable of implementing a scanner function;
a copier section capable of implementing a copier function;
a facsimile section capable of implementing a facsimile function; and
a detecting unit that detects operation of at least one of the printer section, the scanner section, the copier section, and the facsimile section,
wherein the creating unit creates the annexed information sets when the detecting unit detects that none of the printer section, the scanner section, the copier section, and the facsimile section is operating.

8. The data-processing device according to claim 1, wherein the additional information is added to the image file as an Exif header.

9. A method of processing data files, the method comprising:
acquiring additional information from a storing unit, the storing unit storing a plurality of image files, each of the plurality of image files including image data, the additional information and the identifying information, the identifying information identifying the image file;
creating an annexed information set with respect to each of the plurality of image files, the annexed information set including the additional information and identifying information corresponding to the additional information, the identifying information identifying the image file;
determining one of a plurality of pieces of the additional information included in the annexed information sets corresponding to the plurality of image files; and
recording, on a recording medium, the image data of the image file identified by the identifying information corresponding to the additional information determined in the determining step,
wherein the creating step further comprises:
connecting the storing unit to a connector provided on a main body, the storing unit being detachably connected to the connector;
storing the identifying information in an identifying information storing unit;
determining whether or not the annexed information set is stored in the storing unit;
comparing the identifying information in the annexed information set with the identifying information in the identifying information storing unit when the storing unit that stores the annexed information set is determined in the determining step; and
deleting the annexed information set when the identifying information included in the annexed information set is not identical to the identifying information stored in the identifying information storing unit.

10. The method according to claim 9, wherein the determining step comprises:
displaying a plurality of pieces of the additional information included in the annexed information sets corresponding to the plurality of image files; and
selecting one of the plurality of pieces of the additional information displayed in the displaying step,
wherein, in the recording step, the image data of the image file identified by the identifying information corresponding to the additional information selected in the selecting step is recorded on the recording medium.

11. The method according to claim 9, wherein the determining step comprises:
inputting a condition; and
extracting the additional information satisfying the condition from the annexed information sets, and
wherein, in the recording step, the image data of the image file identified by the identifying information corresponding to the additional information extracted by the extraction unit is recorded on the recording medium.

12. The method according to claim 11, wherein the determining step further comprises:
displaying one or more pieces of the additional information extracted in the extracting step on a display unit; and
selecting one of the one or more pieces of the additional information displayed on the display unit, and
wherein, in the recording step, the image of the image file identified by the identifying information corresponding to the additional information selected in the selecting step is recorded on the recording medium.

13. The method according to claim 9, further comprising storing the annexed information sets in the storing unit.

14. The method according to claim 9, further comprising inputting an instruction to execute the creating step;
wherein the annexed information sets are created in the creating step, after the inputting step.

15. The method according to claim 9, further comprising detecting operation of at least one of a printer section, a scanner section, a copier section, and a facsimile section, before the creating step;
wherein the annexed information set are created in the creating step when no operation of the printer section, the scanner section, the copier section, and the facsimile section is detected in the detecting step.

16. A non-transitory computer readable recording medium storing a set of program instructions executable on a data-processing device, instructions comprising:
acquiring additional information from a storing unit, the storing unit storing a plurality of image files, each of the plurality of image files including image data, the additional information and the identifying information, the identifying information identifying the image file;
creating an annexed information set with respect to each of the plurality of image files, the annexed information set including the additional information and identifying information corresponding to the additional information, the identifying information identifying the image file;
determining one of a plurality of pieces of the additional information included in the annexed information sets corresponding to the plurality of image files; and
recording, on a recording medium, the image data of the image file identified by the identifying information corresponding to the additional information determined in the determining step, wherein the creating step further comprises:
connecting the storing unit to a connector provided on a main body, the storing unit being detachably connected to the connector;
storing the identifying information in an identifying information storing unit;
determining whether or not the annexed information set is stored in the storing unit;
comparing the identifying information in the annexed information set with the identifying information in the identifying information storing unit when the storing unit that stores the annexed information set is determined in the determining step; and
deleting the annexed information set when the identifying information included in the annexed information set is not identical to the identifying information stored in the identifying information storing unit.

* * * * *